(12) United States Patent
Pollkoetter

(10) Patent No.: US 6,325,873 B1
(45) Date of Patent: Dec. 4, 2001

(54) METHOD AND DEVICE FOR PRODUCING A ONE-PIECE VEHICLE WHEEL

(75) Inventor: Guenter Pollkoetter, Beckum (DE)

(73) Assignee: Leico GmbH & Co. Werkzeugmaschinenbau, Ahlen (DE)

( * ) Notice: Subject to any disclaimer, the term of this patent is extended or adjusted under 35 U.S.C. 154(b) by 0 days.

(21) Appl. No.: 09/424,587

(22) PCT Filed: May 7, 1998

(86) PCT No.: PCT/EP98/02688

§ 371 Date: Nov. 24, 1999

§ 102(e) Date: Nov. 24, 1999

(87) PCT Pub. No.: WO98/53937

PCT Pub. Date: Dec. 3, 1998

(30) Foreign Application Priority Data

May 26, 1997 (DE) .............................. 197 21 962
Feb. 26, 1998 (DE) .............................. 198 08 106

(51) Int. Cl.⁷ .................... C22F 1/04; B23P 17/00
(52) U.S. Cl. ............... 148/552; 29/894.324; 29/33 P; 29/563; 29/527.6
(58) Field of Search ............... 29/894.324, 563, 29/33 P, 564.7, 527.6; 266/255, 259; 148/552

(56) References Cited

U.S. PATENT DOCUMENTS 3,263,315 * 8/1966 O'Brien ............... 29/894.324
3,822,458 * 7/1974 Schulte et al. ........ 29/894.324

FOREIGN PATENT DOCUMENTS 57-207162 * 12/1982 (JP).

* cited by examiner

Primary Examiner—P. W. Echols
(74) Attorney, Agent, or Firm—Oblon, Spivak, McClelland, Maier & Neustadt, P.C.

(57) ABSTRACT

An apparatus and a method for producing a one-part vehicle wheel are provided, in which a substantially disk-shaped, undercut-free pre-form is cast. Immediately after casting the pre-form is conveyed to a flow-forming machine, while maintaining a residual heat and is fixed therein. The circumferential area of the fixed pre-form is split and, by subsequent spinning and flow-forming, is constructed as an intermediate form with a rim, which already substantially has the wall thickness of the rim of the finished vehicle wheel. The intermediate form is cooled, sized, and undergoes a final end-working.

12 Claims, 7 Drawing Sheets

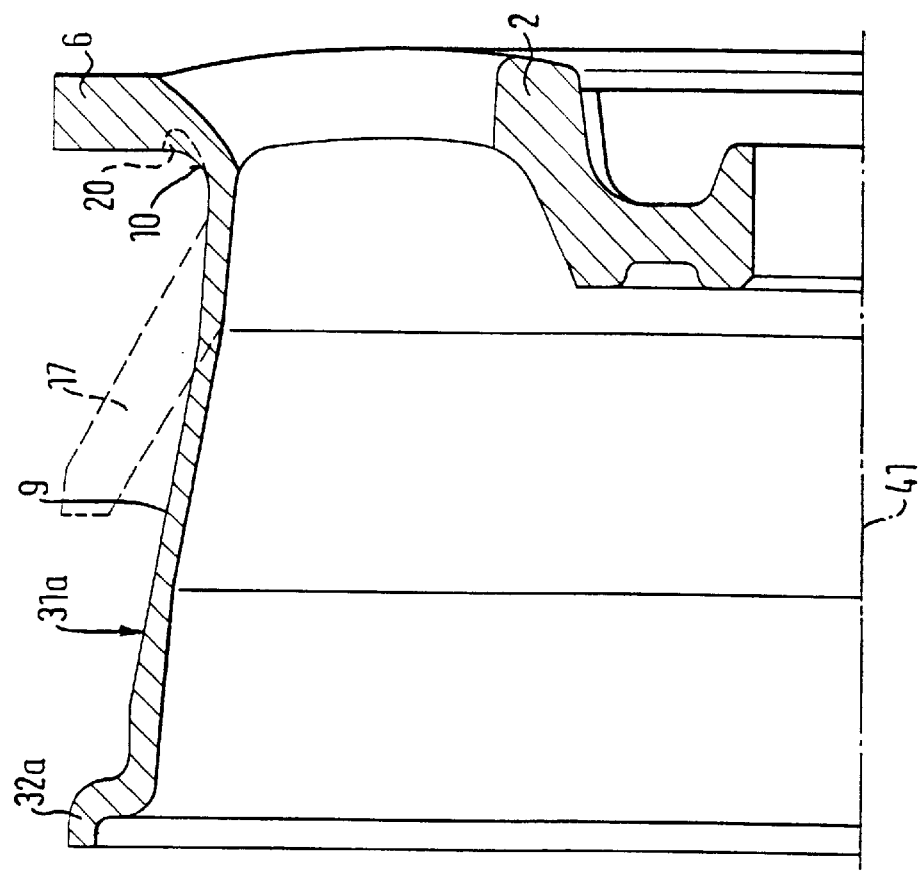
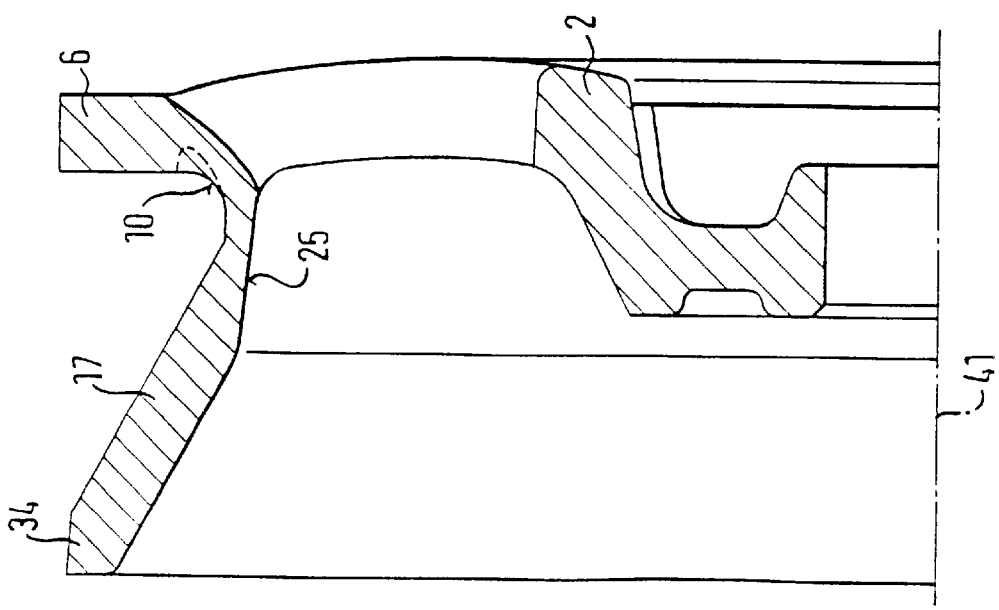

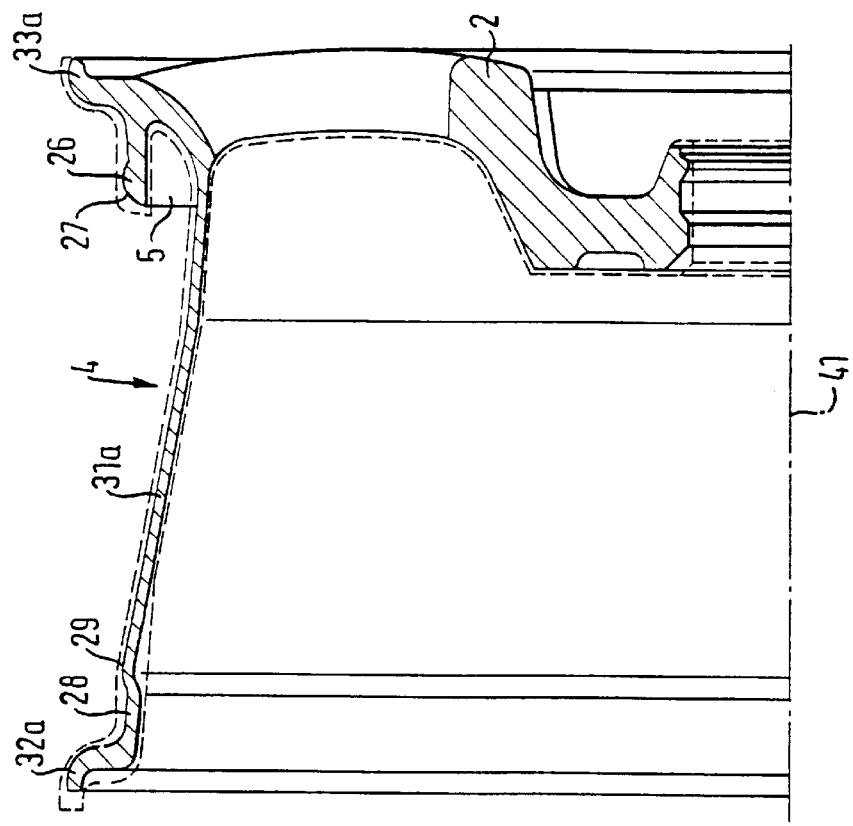
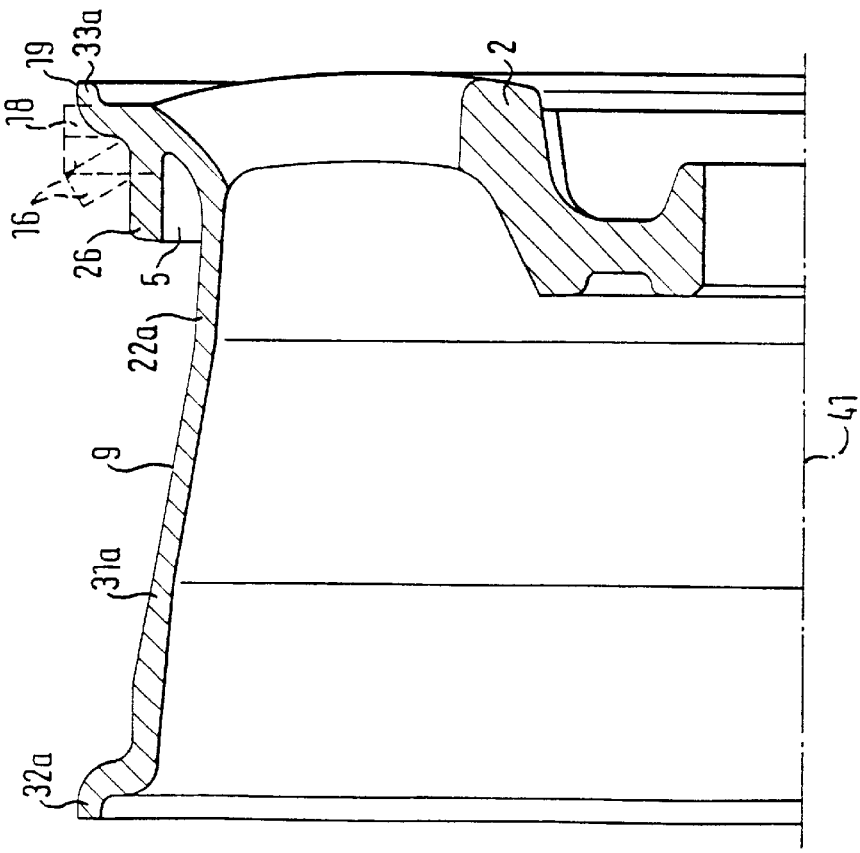

METHOD AND DEVICE FOR PRODUCING A ONE-PIECE VEHICLE WHEEL

CROSS-REFERENCE TO RELATED APPLICATIONS

This application relates to and claims priority, under 35 U.S.C. §119, from German Patent Application No. 197 21 962.4, filed on May 20, 1997, and German Patent Application No. 198 08 106.5, filed on Feb. 26, 1998, the entire contents of both German Patent Applications hereby being incorporated by reference herein.

BACKGROUND OF THE INVENTION

1. Field of the Invention

The present invention generally relates to an apparatus and a method for producing a one-part vehicle wheel with a hub and a rim.

2. Discussion of Background

It is known to manufacture vehicle wheels by casting. Compared with a cast workpiece as such, a higher strength can be obtained if a blank is shaped in a drop forge and is then further worked on a flow-forming machine. Such known methods are complicated and costly as a result of the tools required.

SUMMARY OF THE INVENTION

An object of the present invention is to provide a method and an apparatus with which it is possible to produce, simply and with high strength, vehicle wheels.

According to the present invention, the above-stated object is achieved by a method for the production of a one-part vehicle wheel having a hub and a rim, wherein: an undercut-free, substantially disk-shaped pre-form is cast; immediately following casting the pre-form is transported to a flow-forming machine, while maintaining a residual heat and is fixed therein; the fixed pre-form is split in its circumferential area and by subsequent spinning and flow-forming is shaped to an intermediate form with a rim base area, which already substantially has the wall thickness of the rim of the finished vehicle wheel; the intermediate form is cooled; and the cooled intermediate form is sized and end-worked to produce the finished vehicle wheel.

The design of the pre-form, as a substantially disk-shaped, undercut-free workpiece, makes it possible to use a simply constructed casting tool. Instead of a usually necessary, multi-part segmental tool, it is possible to use a simple, two-part casting tool. It is also possible to obviate the complicated removal of cast seams, which are unavoidable in multi-part tools. The central area of the cast pre-form substantially corresponds to the hub of the finished vehicle wheel.

A simplification of the manufacturing process, accompanied by significant energy saving, results from the immediate transportation of the cast pre-form to the next working step on a flow-forming machine. After casting, the pre-form has a temperature of approximately 300° C. Particularly when using light metals, it is advantageous, for avoiding cracks, to carry out flow-forming at an elevated temperature, which is preferably above the re-crystallization temperature of the material. During flow-forming of a heated pre-form, the forming forces required are much lower than with workpieces at room temperature.

Compared with the hitherto known methods, in which the rim contour and wall thickness are provided with a certain allowance for the final mechanical machining, in the method, according to the present invention, following calibration, the rim base and lateral rim beads are substantially end-shaped. For the lateral areas and the formation of bores, a certain metal-removing working is required.

The method, according to the present invention, is advantageously further developed in that the pre-form, after casting and prior to shaping to the intermediate shape, is supplied with additional heat. For example, the pre-form is heated to approximately 400° C. in a furnace, which the pre-form passes through on conveyance from the casting equipment to the flow-forming machine. In the furnace, it is merely necessary to heat from the temperature after casting to the desired machining temperature during flow-forming. Compared with heating which is started from room temperature, this leads to shorter warm-up times and an improved energy balance.

According to another variant of the present invention, the vehicle wheel is manufactured from a non-age-hardenable aluminium alloy, particularly, Gk-Al Si 11 Mg. The intermediate form requires no additional heat treatment and can be sized directly after cooling. Cooling can take place in a tunnel-like cooling device, which the intermediate form passes through on conveyance to the sizing device.

An alternative variant comprises the vehicle wheel being manufactured from an artificially ageable aluminium alloy, particularly, Gk-Al Si 7 Ma Wa.

Such aluminium alloys can readily undergo non-cutting shaping. In order to obtain a desired strength, following the shaping of the intermediate form, a heat treatment is necessary.

The heat treatment preferably comprises the intermediate form undergoing a solution heat treatment and a quench cooling. The temperature control and duration of the solution heat treatment, as well as the speed during quench cooling, are dependent on the material used. The cooling normally, takes place to room temperature.

Another variant of the method, according to the present invention, comprises the sizing of the rim being performed by a section roller on a flow-forming machine and wherein the rim only mechanically undergoes end-working in its lateral areas at the rim beads. The section roller has a contour, which is the negative form of the desired contour of the rim base and rim beads. Thus, sizing can take place by a simple, radial infeeding of a section roller.

The above-described object of the present invention can also be achieved by a method for producing a one-part vehicle wheel with a hub and a rim, as follows. The circumferential area of a substantially disk-shaped pre-form is split a first time. By subsequent spinning and flow-forming an intermediate form is shaped with a radial flange and a rim base area, which already substantially has the wall thickness of the rim of the finished vehicle wheel. The radial flange is then split a second time into an outer leg and an inner leg directed towards the rim base. From the outer leg is finally shaped a rim bead and from the inner leg a roughly axially directed rim shoulder and an undercut is formed between the rim base area and the rim shoulder.

In a preferred method variant, by spinning and flow-forming, the rim bead is shaped from the outer leg and the rim shoulder is shaped from the inner leg.

Another advantageous method variant comprises a hump being shaped on the rim shoulder.

According to the present invention, an apparatus is provided for achieving the object, as follows. The undercut-free castings permit a simple, problem-free manufacture of preforms. Whereas complicated castings must initially be cleaned, in the case of the present invention, the simple parts can be directly supplied to a flow-forming process. During transportation, planned cooling and additional heating of the still-heated castings leads to a desired flow-forming temperature being obtained.

BRIEF DESCRIPTION OF THE DRAWING FIGURES

The present invention is described in greater detail hereinafter relative to preferred embodiments and the attached drawings, which show:

FIG. 7 is a partial cross-sectional view of an intermediate form during shaping for forming the rim base;

FIG. 8 is a partial cross-sectional view of an intermediate form after the second splitting and a shaping for forming the rim base with inside rim bead;

FIG. 9 is a partial cross-sectional view of an intermediate form following a shaping process for forming an undercut and an outside rim bead; and FIG. 10 is a partial cross-sectional view of a vehicle wheel produced, according to the present invention, with an end-shaped rim with undercut.

DETAILED DESCRIPTION OF THE PREFERRED EMBODIMENTS

Figure 1:
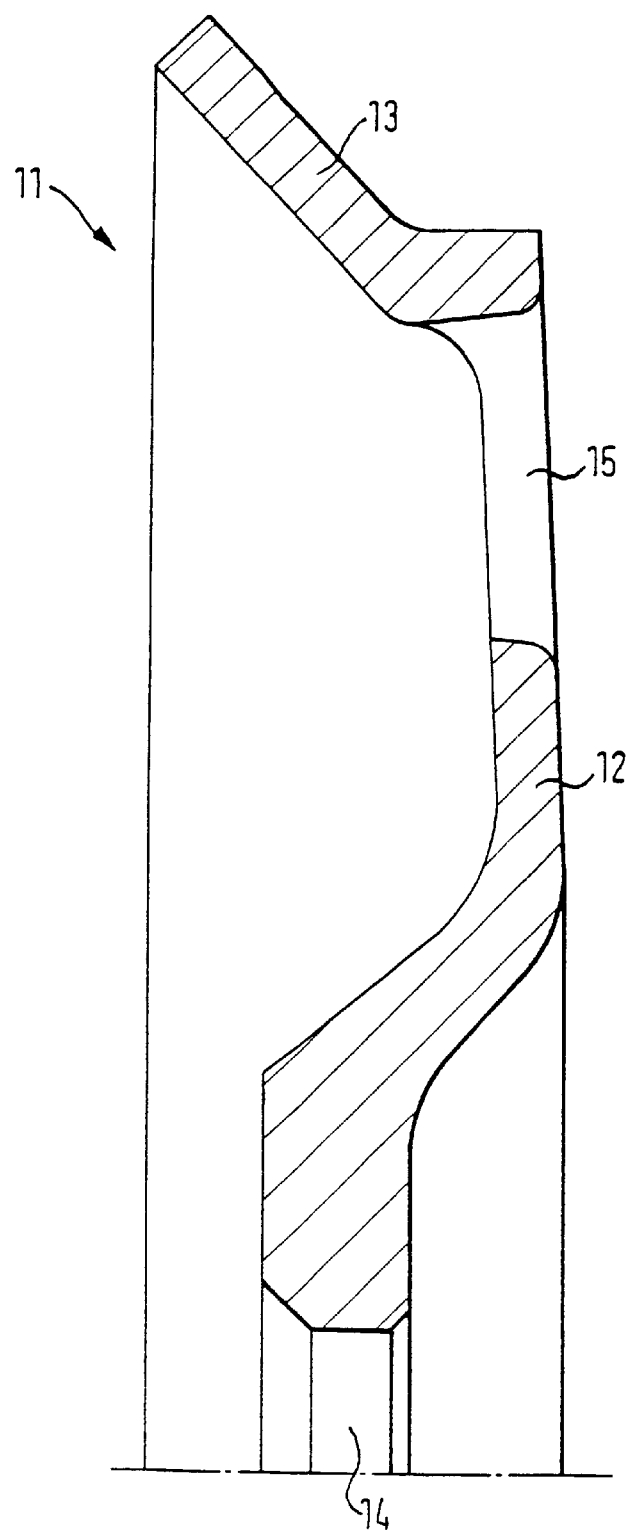
FIG. 1 is a partial cross-sectional view of a pre-form.

FIG. 1 shows a cast, substantially disk-shaped pre-form 11, which has a hub area 12 and an inclined circumferential area 13. In the hub area 12, a central opening 14 and further openings 15 are provided. During casting, the hub area 12 is shaped in such a way that, other than for a limited metal removal in the vicinity of the central opening 14, it corresponds to a hub of the finished vehicle wheel.

Figure 2:
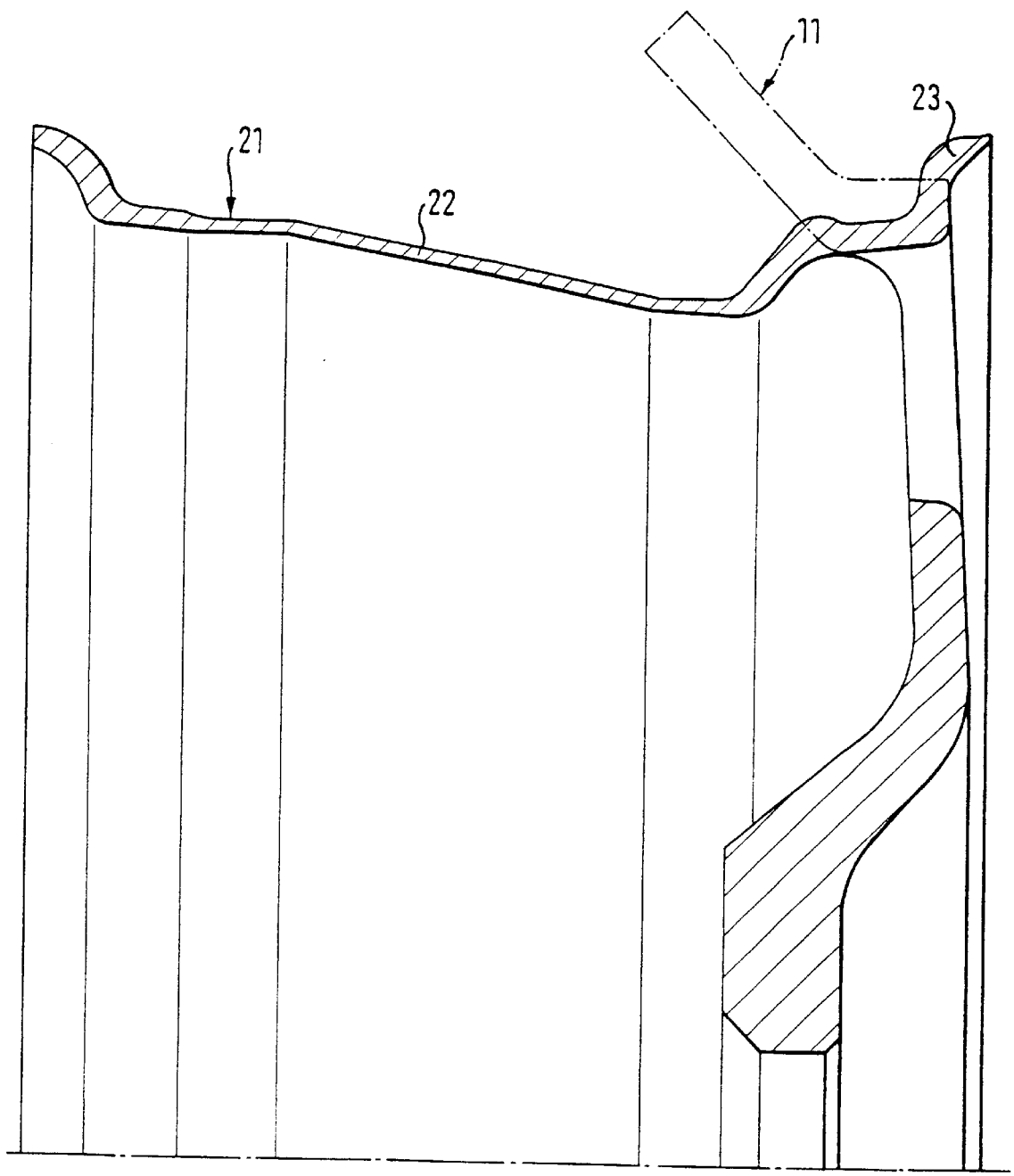
FIG. 2 is a partial cross-sectional view of an intermediate form.

Immediately following removal from a mold, the pre-form 11 is transported to a flow-forming machine, in which the pre-form 11, shown in dashed line outline form in FIG. 2, is shaped, in a non-cutting manner, to an intermediate form 21. For this purpose, the pre-form 11 is fixed in a spinning chuck with a corresponding outer contour. The circumferential area 13 of the pre-form 11 is then split, so that a larger part of the circumferential area 13 is flow-formed, on one side, to a rim base area 22 and a smaller part, on the other side, to a rim bead area 23. The rim base area 22 and rim bead area 23 are constructed in such a way that they have the wall thickness of the rim of the finished vehicle wheel and require only limited sizing and re-working. The flow-forming process is performed under elevated temperature, produced on the workpiece during casting and on transportation to the flow-forming machine.

The intermediate form 21 is then cooled. This can take place, in the same setting, on the flow-forming machine or preferably, on transporting to a second flow-forming machine, which is used for sizing the workpiece contour. As a function of the choice of material, a heat treatment, e.g. an artificial aging, can take place beforehand.

Figure 3:
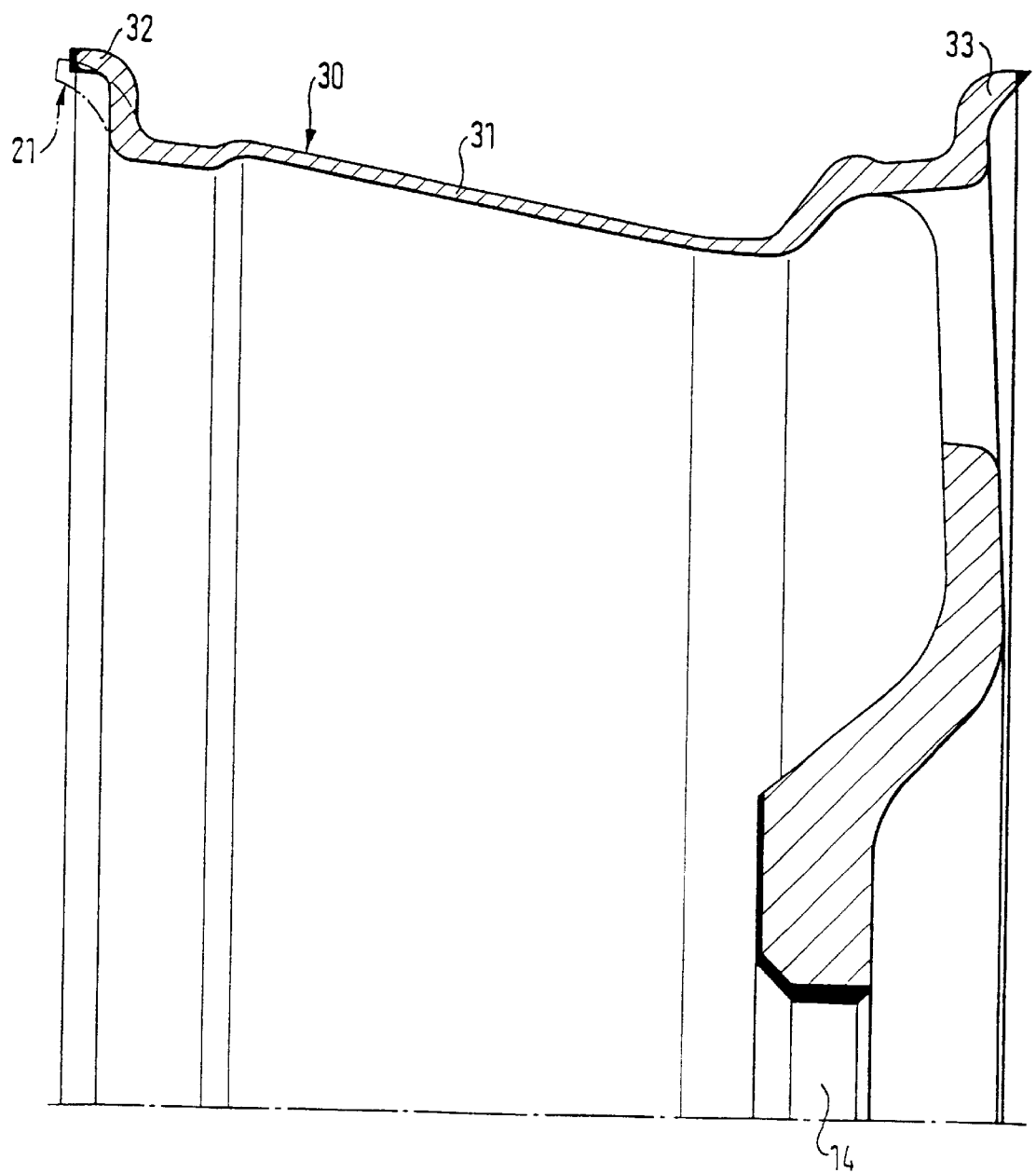
FIG. 3 is a partial cross-sectional view of the intermediate form after sizing.

Following the cooling of the intermediate form 21, the intermediate form 21 is sized on a flow-forming machine, as can be gathered from FIG. 3. The intermediate form 21, shown in dashed line outline form, is fixed in a spinning chuck. A profiling roller, whose outer contour corresponds to the desired profile of a rim base 31 of a finished vehicle wheel 30, is radially infed to the intermediate form 21. The two rim beads 32, 33 are also shaped during sizing.

Finally, the shaped edges, of the two rim beads 32, 33, and the area, of the central opening 14, are then end-worked by material removal. The material removals, represented as black surface areas, are kept to a minimum, as is apparent from FIG. 3.

Figure 4:
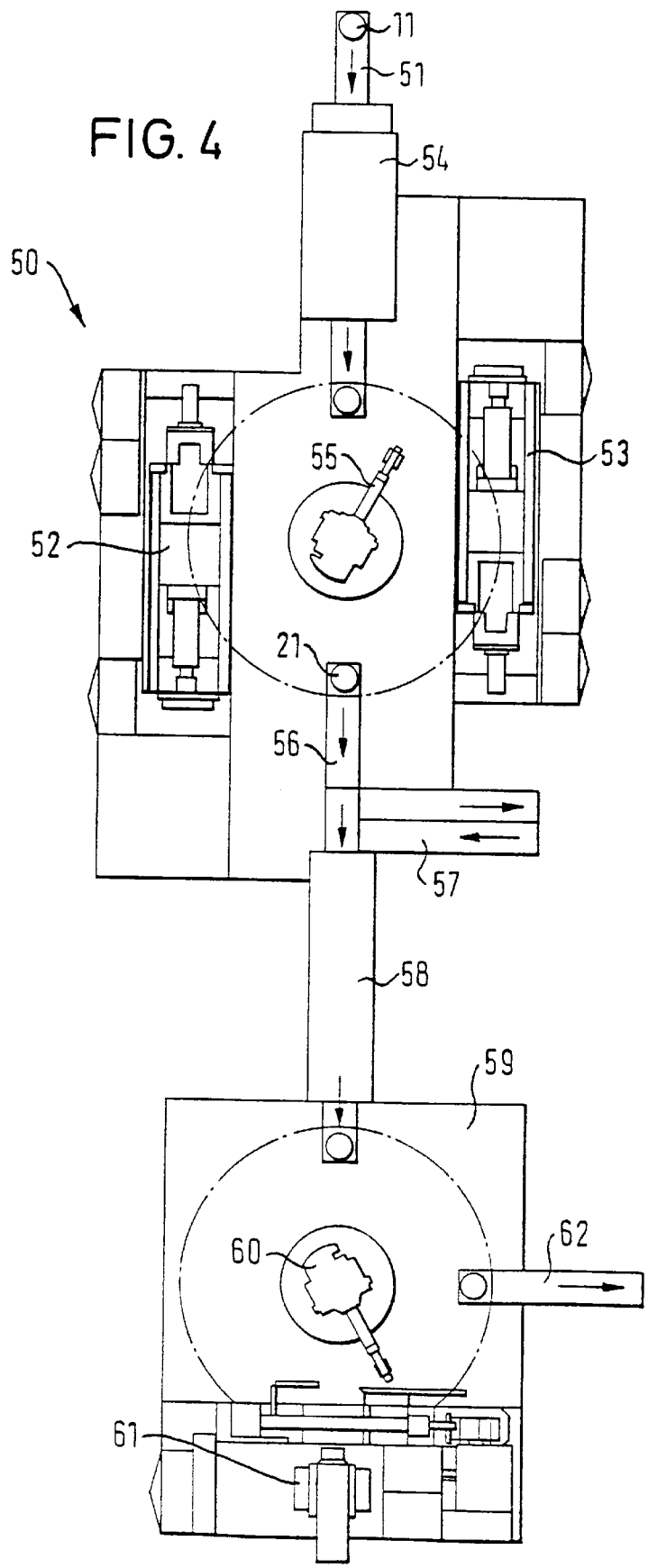
FIG. 4 is a plan view of an apparatus according to the present invention for performing the inventive method.

An apparatus 50 for performing a method variant, according to the present invention, is shown in FIG. 4. A pre-form 11, removed from a mold and having temperature lower than the melting point of the material, but higher than ambient temperature, is conveyed by means of a conveyor belt 51 to a flow-forming station, which in this embodiment has two flow-forming machines 52, 53. On the way to the flow-forming station, the conveyor belt 51 passes through a tunnel-like heating furnace 54. The heating furnace can heat the pre-form 11 from its elevated temperature, immediately after casting, to a desired flow-forming temperature.

The heated pre-form 11 is removed, by means of a handling device 55, from the conveyor belt 51, and is supplied to one of the two flow-forming machines 52, 53. The handling device 55 is also used for removing the shaped intermediate forms 21 from the flow-forming machines 52, 53 and for placing on a further conveyor belt 56. Alongside a buffer section 57, a heat treatment station, for solution heat treatment, can be provided at the conveyor belt 56. In the represented embodiment, the conveyor belt 56 passes through a tunnel-like cooling device 58 to a calibrating or sizing station 59. By means of a further handling device 60, the cooled intermediate form 21 is conveyed by the conveyor belt 56 to a flow-forming machine 61 in which sizing takes place. A mechanical end-working of the workpiece can also take place in the sizing station 59. The end-shaped workpiece is conveyed with the aid of the handling device 60 for conveyance away to a further conveyor belt 62.

Figure 5:
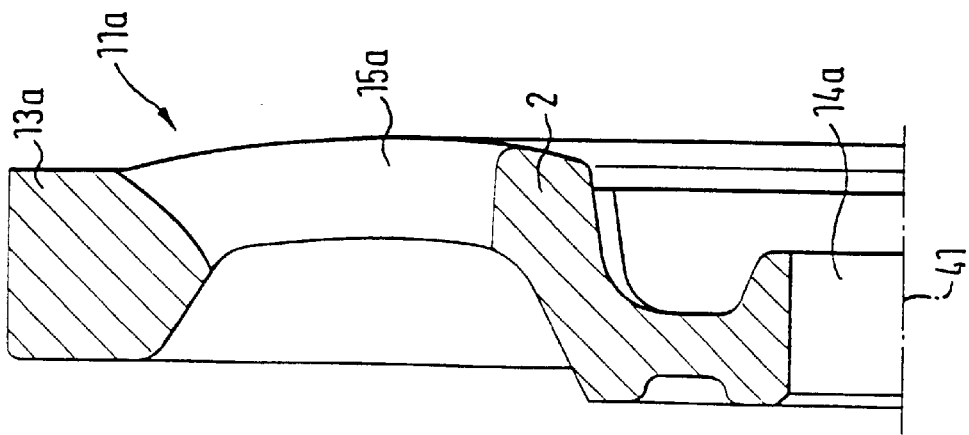
FIG. 5 is a partial cross-sectional view of a further pre-form for performing a method variant.

FIG. 5 shows another pre-form 1a, on the basis of which, the method, according to the present invention, is carried out in accordance with a preferred variant. The pre-form 11a comprises a finished wheel body 2, which is fundamentally radially constructed. The preform form 11a also includes a central opening 14a and openings 15a. A circumferential area 13a is approximately symmetrically constructed with respect to a central plane perpendicular to the central axis 41.

Figure 6:
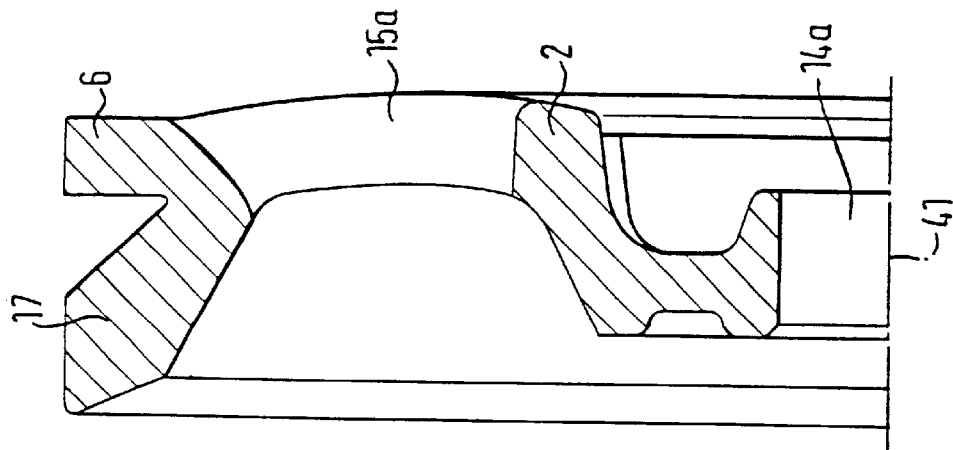
FIG. 6 is a partial cross-sectional view of an intermediate form following the first splitting.

FIG. 6 shows an intermediate form, which results from the pre-form 11a, shown in FIG. 5, as a result of the splitting of the circumferential area 13a into two legs. FIG. 6 also shows a radial flange 6 and an area 17 coaxial to the central axis 41.

FIG. 7 shows an intermediate form in which the coaxial area is made almost conical with respect to a free end 34. The coaxial area 17 and radial flange 6 enclose a comer area 10, The construction of the comer area 10 decisively determines the undercut 5 to be produced (cf., FIGS. 9 and 10). An inner wall 25 of the coaxial area 17, which is directed towards the central axis 41, has a construction which, like the wheel body 2, corresponds to the finished vehicle wheel.

The wall thicknesses and lengths of the radial flange 6 and coaxial area 17 are dimensioned in such a way that the resulting material accumulation is suitable for the desired construction of a rim 4 (cf., FIG. 10).

In dashed line outline form, FIG. 8 shows the coaxial area 17. In continuous line form, a rim base 31a is shown having an inside rim bead 32a in a pre-formed construction. The shaping of the coaxial area 17, to the pre-formed rim base 31a and pre-formed inside rim bead 32a, takes place in a spinning device with the aid of radially adjustable, spinning rollers (not shown) and in particular, under heat action. The rim base 31a, with inside rim bead 32a, can also be referred to as a long wheel side 9, as opposed to a short wheel side 19 (cf., FIGS. 9 and 10). In the comer area, a recess 20 is indicated by a dot-dash line. The recess 20 can optionally be formed by, e.g., a material removal or spinning of the radial flange 6 in the comer area. The recess 20 leads to a further weight reduction, which is particularly advantageous.

The long wheel side 9 is merely pre-formed by flow-forming, according to FIG. 8, whereas a final profiling or finish turning is shown in FIG. 10.

FIG. 9 shows the construction of an undercut 5 between the rim base area 22a and the rim shoulder 26 in a flow-forming machine, in that at least one, splitting roller (non shown) acts on the radial flange 6. As is clear from the dot-dash and dashed lines of the radial flange 6, the latter is radially split, so as to form an inner leg 16 and an outer leg 18. Both legs 16, 18 are mainly symmetrically constructed, so that the splitting process can be performed particularly precisely. A continuous line indicates an outside rim wing 33a and a rim shoulder 26, which are formed by spinning rollers from the outer leg 18 or inner leg 16. The outside rim bead 33a is bent outwardly, whereas the rim shoulder 26 passes substantially horizontally and axially parallel to the central axis 41. In the vicinity of the rim shoulder 26, the tyre, having a tyre bead, is located. FIG. 9 clearly shows the construction of the undercut 5 and the resulting material savings and weight reduction.

FIG. 10 shows a finished vehicle wheel. A hump 27 is formed on the rim shoulder 26. The contours of the rim base 31a, an inside rim shoulder 28, the hump 27, a further hump 29, the inside rim bead 32a, and the rim shoulder 26, in the vicinity of the outside rim bead 33a and the undercut 5, are standardized and are obtained by machining.

What is claimed is:

1. A method of producing a one-part vehicle wheel, wherein said one-part vehicle wheel has a hub and a rim, said method comprising the steps of:

casting a pre-form, wherein said pre-form is undercut-free and substantially disk-shaped;

immediately after said step of casting, conveying said preform, on a conveyor means, to said flow-forming machine;

during said step of conveying, setting a desired flow-forming temperature of said pre-form using a temperature regulating device;

fixing said pre-form in a flow-forming machine to form a fixed pre-form, while maintaining a residual heat;

shaping said fixed preform by spinning and flow-forming to produce an intermediate form having a rim base area, said intermediate form having a wall thickness substantially equal to a thickness of a rim of a finished vehicle wheel;

splitting a circumferential area of said fixed pre-form prior to spinning and flow-forming;

cooling said intermediate form; and after said cooling step, sizing and end-working said intermediate form to produce said finished vehicle wheel.

2. The method according to claim 1, wherein after said step of casting and before the shaping to produce said intermediate form, supplying additional heat to said preform.

3. The method according to claim 1, wherein said vehicle wheel is manufactured from a non-age-hardenable aluminium alloy.

4. The method according to claim 3, wherein said non-age-hardenable aluminium alloy is Gk-AlSi 11 Mg.

5. The method according to claim 1, wherein said vehicle wheel is manufactured from an artificially ageable aluminium alloy.

6. The method according to claim 5, further comprising solution heat treating and quench cooling said intermediate form.

7. The method according to claim 5, wherein said artificially ageable aluminium alloy is Gk-AlSi 7 Ma Wa.

8. The method according to claim 1, wherein said step of sizing of said rim is carried out using a section roller on a flow-forming machine and, wherein said step of end-working of said rim is only mechanically done at lateral areas of said rim beads.

9. An apparatus for producing a one-part vehicle wheel, said apparatus comprising:

a casting station for casting pre-forms, wherein said casting station is constructed for casting pre-forms which are undercut-free and substantially disk-shaped;

a flow forming station with at least one flow-forming machine;

a conveyor means, positioned between said casting station and said flow-forming station, for conveying said pre-forms from said casting station to said flow-forming station; and a temperature regulating means, located along said conveyor means, for regulating temperature to set a desired flow-forming temperature of said pre-forms while said pre-forms are being conveyed on said conveying means.

10. The apparatus for producing a one-part vehicle wheel of claim 9, wherein said temperature regulating means is a heating furnace.

11. An apparatus for producing a one-part vehicle wheel, said apparatus comprising:

a casting station configured so that pre-forms which are undercut-free and substantially disk-shaped, are cast therein;

a flow forming station with at least one flow-forming machine;

a conveyor positioned between said casting station and said flow-forming station and configured to convey said pre-forms from said casting station to said flow-forming station; and a temperature regulator located along said conveyor means and configured to regulate temperature to set a desired flow-forming temperature of said pre-forms while said pre-forms are being conveyed on said conveyor.

12. The apparatus for producing a one-part vehicle wheel of claim 11, wherein said temperature regulating means is a heating furnace.

* * * * *